(12) United States Patent
Deme

(10) Patent No.: US 8,025,724 B2
(45) Date of Patent: Sep. 27, 2011

(54) SULPHUR PELLET COMPRISING $H_2S$-SUPPRESSANT

(75) Inventor: Imants Deme, Burlington (CA)

(73) Assignee: Shell Oil Company, Houston, TX (US)

( * ) Notice: Subject to any disclaimer, the term of this patent is extended or adjusted under 35 U.S.C. 154(b) by 263 days.

(21) Appl. No.: 10/582,060

(22) PCT Filed: Dec. 8, 2004

(86) PCT No.: PCT/EP2004/053357
§ 371 (c)(1),
(2), (4) Date: Jun. 8, 2006

(87) PCT Pub. No.: WO2005/059016
PCT Pub. Date: Jun. 30, 2005

(65) Prior Publication Data
US 2007/0125268 A1    Jun. 7, 2007

(30) Foreign Application Priority Data
Dec. 10, 2003    (EP) ..................... 03257777

(51) Int. Cl.
*C08L 95/00* (2006.01)
*C09C 1/22* (2006.01)
*B05D 5/10* (2006.01)

(52) U.S. Cl. .............. 106/273.1; 106/274; 106/275; 106/281.1; 106/456; 427/138

(58) Field of Classification Search ............ 106/247, 106/273.1, 274, 275, 281.1, 456; 427/138; 23/293 S, 313 P, 313 R; 126/343.54
See application file for complete search history.

(56) References Cited

U.S. PATENT DOCUMENTS

| | | | | |
|---|---|---|---|---|
| 3,738,853 A * | 6/1973 | Kopvillem et al. | ........... | 106/274 |
| 3,960,585 A * | 6/1976 | Gaw | ........... | 106/274 |
| 4,043,717 A | 8/1977 | Riano | ........... | 425/7 |
| 4,081,500 A | 3/1978 | Malcolm | ........... | 264/9 |
| 4,224,079 A * | 9/1980 | Espenscheid | ........... | 106/274 |
| 4,276,093 A * | 6/1981 | Pickermann | ........... | 106/281.1 |
| 4,756,763 A * | 7/1988 | Etnyre | ........... | 106/281.1 |
| 4,769,288 A * | 9/1988 | Saylak | ........... | 428/403 |
| 5,277,710 A * | 1/1994 | Aho | ........... | 106/273.1 |
| 6,133,351 A * | 10/2000 | Hayner | ........... | 524/62 |
| 6,706,787 B1 * | 3/2004 | Burris et al. | ........... | 524/60 |
| 2003/0073761 A1 | 4/2003 | Butler et al. | ........... | 524/59 |

FOREIGN PATENT DOCUMENTS

| | | | |
|---|---|---|---|
| AU | 9715194 | * | 10/1997 |
| AU | 9715194 A | * | 10/1997 |
| DE | 10058712 | | 6/2002 |
| EP | 0121377 | | 10/1984 |
| EP | 1398351 A1 | * | 3/2004 |
| GB | 1528384 | | 10/1978 |
| GB | 2384240 | | 7/2003 |
| JP | 2001 081325 | | 3/2001 |
| JP | 2002138197 | | 5/2002 |
| JP | 2003333909 | | 11/2003 |
| WO | 92/10270 | | 6/1992 |
| WO | WO2005059026 | | 6/2005 |

* cited by examiner

*Primary Examiner* — Anthony Green
*Assistant Examiner* — Pegah Parvini
(74) *Attorney, Agent, or Firm* — Charles W. Stewart

(57) ABSTRACT

The invention provides a sulphur pellet comprising at least one $H_2S$-suppressant, comprising in the range of from 60 to 100 wt % elemental sulphur, based on the total weight of the pellet. The invention further provides a process for the manufacture of sulphur pellets comprising at least one $H_2S$-suppressant, comprising the steps of:

(a) mixing elemental sulphur, one or more $H_2S$-suppressants and optionally a filler in a mixing unit to obtain a mixture;
(b) shaping and/or palletizing the mixture obtained in step (a) in a palletizing unit to obtain $H_2S$-suppressant-comprising sulphur pellets.

The invention further provides a process for the manufacture of a sulphur-comprising asphalt paving mixture comprising the steps of:

(i) preheating bitumen at a temperature of between 140 and 180° C.;
(ii) preheating aggregate at a temperature of between 140 and 180° C.;
(iii) mixing the hot bitumen with the hot aggregate in a mixing unit, wherein sulphur pellets comprising $H_2S$-suppressant according to the invention are added in at least one of the steps (i), (ii) or (iii).

The invention also provides the use of a sulphur-comprising asphalt paving mixture comprising $H_2S$-suppressant in the paving of roads.

27 Claims, No Drawings

US 8,025,724 B2

SULPHUR PELLET COMPRISING $H_2S$-SUPPRESSANT

The present application claims priority of European Patent Application No. 03257777.7 filed 10 Dec. 2003.

FIELD OF THE INVENTION

The invention relates to a sulphur pellet. The invention further relates to a process for the manufacture of sulphur pellets. The invention also relates to a process for the manufacture of a sulphur-comprising asphalt paving mixture using sulphur pellets according to the invention.

BACKGROUND OF THE INVENTION

In the road construction and road paving industry, it is a well-practised procedure to coat aggregate material such as sand, gravel, crushed stone or mixtures thereof with hot fluid bitumen, spread the coated material as a uniform layer on a road bed or previously built road while it is still hot, and compact the uniform layer by rolling with heavy rollers to form a smooth surfaced road.

The combination of bitumen with aggregate material, such as sand, gravel, crushed stone or mixtures thereof, is also referred to as "asphalt". Bitumen, also referred to as "asphalt binder", is usually a liquid binder comprising asphaltenes, resins and solvents. Bitumen can for example comprise pyrogenous mixtures derived from petroleum residues such as residual oils, tar or pitch or mixtures thereof.

It is known in the art that sulphur can be mixed with bitumen for applications in the road construction and road paving industry.

In US 2003/073761 A1 a composition comprising sulphur, a thermoplastic elastomer and tetramethylhiuram disulfide is described.

In GB-A-2,384,240 a composition comprising sulphur in the range of from 0.01 to 2 wt %) is described.

In DE 110,58,712 A1 a composition comprising 18.4 wt % of elemental sulphur) is described.

Efforts towards improving the addition of sulphur to bitumen are for example described in GB 1,528,384. More recently, studies on the use of sulphur in bituminous mixtures have indicated that the use of sulphur-modified bitumen is feasible. Sulphur-modified bitumen is formulated by replacing some of the bitumen in conventional binders by elemental sulphur.

One of the problems encountered when using sulphur in bitumen is the unwanted formation of $H_2S$, resulting from dehydrogenation reactions between bitumen and sulphur at high temperatures.

Even low $H_2S$ emission from sulphur-comprising asphalt, meaning asphalt formulated using sulphur-modified bitumen wherein elemental sulphur has been used to replace part of the bitumen, presents an emission nuisance on road paving projects. This is due to the gradual $H_2S$ gas concentration increase to high levels in the air voids in the loose paving mixture during storage in silos and during truck delivery to the paving site. The "stored" gas is released when the air pockets in the mixture are opened up as the mixture is dumped from the delivery trucks or as the mixture is subjected to mechanical mixing.

In view of the substantial amounts of sulphur used, especially in sulphur-comprising asphalt having high sulphur-bitumen weight ratios, e.g. as high as 1:1, $H_2S$ emission is a serious problem. Therefore, it is necessary to reduce the unwanted formation and emission of $H_2S$ from sulphur-comprising asphalt.

In Patent abstracts of Japan, vol. 2000, no. 20, 2001-07-10 a method for reducing $H_2S$ formation during vulcanization is described. No reference is made to sulphur-bitumen mixtures.

One method to reduce $H_2S$-emission from hot cast sulphur-asphalt mixtures is to add an $H_2S$-suppressant in the process to manufacture sulphur-bitumen mixtures by mixing and heating sulphur and bitumen in the presence of added $H_2S$-suppressant as described in U.S. Pat. No. 3,960,585 and in EP-A-121,377.

A disadvantage of the method described in U.S. Pat. No. 3,960,585 is that liquid $H_2S$-suppressant has to be injected into paving mixture at the mixing plant. Consequently, equipment for injecting has to be set up and maintained at the mixing plant, making the process cumbersome and costly. Another disadvantage is that it is more difficult to achieve a homogeneous distribution of $H_2S$-suppressant in the paving mixture, as a relatively small amount of liquid $H_2S$-suppressant is added to a relatively large mixture of solids and liquids.

SUMMARY OF THE INVENTION

It has now been found that sulphur pellets comprising $H_2S$-suppressant can be successfully used in a process for the manufacture of a sulphur-comprising asphalt paving mixture.

The invention provides a sulphur pellet comprising at least one $H_2S$-suppressant, comprising in the range of from 60 to 100 wt % elemental sulphur, based on the total weight of the pellet. The sulphur pellet according to the invention offers the advantage that when it is used in any process where the aim is to achieve a suppression of $H_2S$ formation or emission, the efficiency of the $H_2S$-suppressant will be higher because the $H_2S$-suppressant will already be close to the source of $H_2S$ formation, namely the sulphur.

The invention further provides a process for the manufacture of sulphur pellets according to the invention, the process comprising the steps of:

(a) mixing elemental sulphur, one or more $H_2S$-suppressants and optionally a filler in a mixing unit to obtain a mixture;
(b) shaping and/or pelletising the mixture obtained in step (a) in a pelletising unit to obtain $H_2S$-suppressant-comprising sulphur pellets.

The invention also provides a process for the manufacture of a sulphur-comprising asphalt paving mixture using $H_2S$-suppressant comprising sulphur pellets according to the invention. The process comprises the steps of:

(i) preheating bitumen at a temperature of between 140 and 180° C.;
(ii) preheating aggregate at a temperature of between 140 and 180° C.;
(iii) mixing the hot bitumen with the hot aggregate in a mixing unit, wherein sulphur pellets comprising $H_2S$-suppressant according to the invention are added in al least one of the steps (i), (ii) or (iii), preferably in step (iii).

The use of sulphur pellets according to the invention offers the advantage that the $H_2S$-suppressant is more homogeneously incorporated in the sulphur-comprising asphalt paving mixture because the $H_2S$-suppressant is added as part of one of the constituents, instead of adding a relatively small amount of liquid $H_2S$-suppressant to a relatively large mixture of solids and liquids.

An even more important advantage is that in the resulting sulphur-comprising asphalt paving mixture, the $H_2S$-suppressant will be in the vicinity of the sulphur as the $H_2S$-suppressant was incorporated in the sulphur pellets. The efficiency of the $H_2S$-suppressant will therefore be higher, as explained before.

The invention also provides the use of a sulphur-comprising asphalt paving mixture comprising $H_2S$-suppressant in the paving of roads.

DETAILED DESCRIPTION OF THE INVENTION

The term "bitumen-aggregate" will be used interchangeable with the term "asphalt". The term "bitumen" as used herein refers to a binder.

Reference herein to pellets is to any type of formed sulphur. Formed sulphur is elemental sulphur that has been cast from the molten state into some kind of regularly sized particle, for example flakes, slates or sphere shaped sulphur such as prills, granules, nuggets and pastilles or half pea sized sulphur.

The sulphur pellet comprises in the range of from 60 to (and including) 100 wt %, preferably from 75 to (and including) 100 wt % and more preferably from 90 to (and including) 100 wt % of elemental sulphur, based on the total weight of the pellet.

Reference herein to an $H_2S$-suppressant is to a compound capable of suppressing the formation or emission of $H_2S$. Typical $H_2S$-suppressants are compounds selected from the class of free radical inhibitors and redox catalysts. Preferred $H_2S$-suppressants are selected from the group of tetra-alkyl-thiuram disulfide, dithiocarbamates, especially zinc dialkyl dithiocarbamates, amine compounds, iodine, copper salts, copper oxides, cobalt salts, cobalt oxides, iron oxides and iron salts.

Preferred iron salts are iron chloride compounds, in particular those iron chloride compounds selected from the group of ferric chloride, hydrated ferric chloride, ferrous chloride and hydrated ferrous chloride. Hydrated ferrous chloride is the most preferred, because of its greater effectiveness as an $H_2S$-suppressant and because of its non-corrosivity.

The sulphur pellet comprising $H_2S$-suppressant according to the invention typically comprises $H_2S$-suppressant in amounts in the range of from 0.02% to 10% (w/w), preferably from 0.05% to 6.5%, more preferably from 0.1% to 2.0%, based on the total pellet.

Typically, the $H_2S$-suppressant is distributed homogeneously throughout the sulphur pellet.

The formation of $H_2S$ originates from sulphur. An important advantage of the sulphur pellets comprising $H_2S$-suppressant according to the invention is that because the $H_2S$-suppressant is added as an integral part of the sulphur pellet, suppression of $H_2S$ formation will be more efficient because the $H_2S$-suppressant will be located in the vicinity of the source for $H_2S$ formation, namely sulphur.

The invention further provides a process for the manufacture of sulphur pellets according to the invention. In step (a) of the process for the manufacture of $H_2S$-suppressant-comprising sulphur pellets according to the invention, elemental sulphur is mixed with one or more $H_2S$-suppressants and optionally a filler in a mixing unit to obtain a mixture.

Preferred $H_2S$-suppressants are compounds selected from the class of free radical inhibitors and redox catalysts as hereinbefore described. Preferably, the $H_2S$-suppressant is added as a solution in a suitable solvent, more preferably as a concentrated solution in a suitable solvent. Typically, the solvent is water. Typically, the $H_2S$-suppressant solution is introduced by pumping the solution from a reservoir unit into the mixing unit.

Typically, the mixing takes place at atmospheric pressure and at elevated temperatures. The mixing can take place at temperatures between 100° C. and 130° C., preferably between 115° C. and 121° C. or at least 113° C.

Elemental sulphur can be introduced into the mixing unit in many ways. Suitably it is added as sulphur powder, or as a flow of molten sulphur or as a slurry of water and sulphur particles.

In one preferred process, the elemental sulphur is introduced as a slurry of water and sulphur particles. Typically, the sulphur particles are dispersed or suspended in the slurry. Preferably, the particles have a size ranging from between about 0.5 to about 150 microns, preferably between about 1.0 and about 100 microns. To avoid the removal of excess water at a later stage in the process, the water content in the sulphur slurry is typically kept as low as possible, preferably between approximately 10 and 40% based on the total weight of the mixture, more preferably between 15 and 30% based on the total weight of the slurry. In the case where the sulphur particles are suspended in the slurry, the sulphur slurry is preferably stirred or mixed in a suitable apparatus to homogenise the slurry prior to introducing it into the manufacturing process.

In a preferred embodiment, the sulphur slurry contains sulphur particles which are dispersed in the water. This type of slurry, henceforth referred to as dispersed or emulsified sulphur slurry, comprises dispersed sulphur particles in water, preferably dispersed micron-sized sulphur particles in water. The sulphur particles are suitably kept in dispersion through the addition of a suitable emulsifier. Suitable emulsifiers are known in the art and are not critical to the invention. An advantage of using dispersed sulphur particles is that the precipitation of sulphur particles is kept to a minimum and the sulphur is distributed more homogeneously throughout the water. Thus, the need for stirring or mixing prior to introducing the sulphur slurry into the reactor unit is reduced. Typically, the slurry is introduced by pumping the slurry from a sulphur slurry reservoir unit into the reactor unit. Preferably, the slurry is stirred or mixed in a suitable apparatus before it is introduced into the mixing unit of step (a).

In another preferred process, the elemental sulphur is introduced into the reactor unit in step (a) as molten sulphur. Molten sulphur can be obtained from solid sulphur, by melting in a suitable melting apparatus, for instance a tube melter.

The use of molten sulphur is advantageous when sulphur is obtained in the molten state from an industrial process. Processes for the removal of unwanted sulphur components from natural gas usually produce sulphur in the molten state and the use of this molten sulphur directly in the sulphur pellet producing process avoids the need for additional steps, such as drying and grinding of the sulphur, to obtain a sulphur slurry. An additional advantage of using molten sulphur is that no additional water is introduced into the process. When adding elemental sulphur in the molten state, the temperature of the sulphur-comprising mixture is preferably kept above the melting point of sulphur, preferably between temperatures of 115° C. and 121° C., to ensure that the sulphur is kept in the molten state.

In yet another preferred process, biologically produced elemental sulphur is used. Reference herein to biologically produced elemental sulphur is to sulphur obtained from a process wherein sulphur-comprising components, such as sulphides or $H_2S$, are converted to elemental sulphur via biological conversion. Biological conversion can suitably be effected using sulphide-oxidising bacteria. Suitable sulphide-oxidising bacteria can be selected for instance from the known autotropic aerobic cultures of the genera *Thiobacillus* and *Thiomicrospira*. An example of a suitable biological conversion process to obtain the biologically produced elemental sulphur suitable for the process according to the invention is the process for the removal of sulphur compounds from gases wherein the gas is washed with an aqueous washing liquid and the washing liquid is subjected to sulphide-oxidising bacteria, as described in WO 92/10270. Biologically produced elemental sulphur has a hydrophilic nature. An advantage of biologically produced elemental sulphur is that fouling or blocking of equipment is substantially reduced or even eliminated due to the hydrophilic nature. The biologically produced elemental sulphur can be introduced into the process as solid sulphur, as a slurry (including dispersed or emulsified sulphur) or as molten sulphur.

To achieve a more homogeneous distribution of the $H_2S$-suppressant throughout the sulphur, the $H_2S$-suppressant and the elemental sulphur are preferably premixed and introduced as a slurry or as a liquid into the mixing unit of step (a).

Optionally, a filler can be added in step (a). Suitable fillers include mineral fillers, such as calcium-based mineral fillers (for example calcium hydroxide). The addition of mineral fillers enables the use of a smaller quantity of sulphur and helps to improve the temperature-stability of the pellets.

Suitably, the amount of filler in the pellet is in the range of from 0.1 to 30% (w/w), preferably from 0.5 to 20%, more preferably from 1 to 10%, based on the total weight of the pellet.

After step (a), a mixture comprising sulphur, one or more $H_2S$-suppressants and optionally a filler is obtained. This mixture is shaped and/or pelletised in a pelletising unit in step (b) to obtain $H_2S$-suppressant comprising pellets.

Suitable pelletising units are units for the formation of granules or pellets as described in Perry's Chemical Engineers' Handbook, chapter 20 (1997) or units wherein a liquid mixture comprising sulphur can be sprayed or poured onto a surface so that sulphur pellets are formed after cooling, for example as described in U.S. Pat. No. 4,081,500 or U.S. Pat. No. 4,043,717. The pelletising unit can suitably comprise a granulator, preferably a drum granulator, or a rotating drum or a device for spraying molten sulphur.

In a preferred process, the mixture comprising sulphur and $H_2S$-suppressant is liquid, the elemental sulphur being in the molten state.

In one preferred embodiment, the pelletising unit comprises a rotating dum. In this embodiment, the liquid mixture comprising sulphur and $H_2S$-suppressant and optionally a filler obtained after step (a) is cooled and solidified on the outside of a rotating drum. The cooled mixture peels off the rotating drum into flakes, the flakes being the sulphur pellets comprising an $H_2S$-suppressant.

In another preferred embodiment, the pelletising unit comprises a means for transporting and the pelletising is done by forming droplets of the liquid mixture obtained after step (a) and depositing these droplets onto the means for transporting, for example a conveyor belt. Suitably, the liquid mixture is sprayed onto a conveyor belt through a spray head. After cooling, the droplets form into pellets.

In yet another preferred embodiment, the pelletising unit comprises a granulator and the pelletising is done by applying successive coats of a liquid mixture obtained after step (a) to solidified particles of a mixture obtained after step (a). The coating is suitably performed until the resulting pellet reaches the desired diameter. Typically, the liquid mixture obtained after step (a) is sprayed into the granulator, thereby coating the solidified particles.

In yet another preferred embodiment, the pelletising unit comprises a spraying device and sulphur pellets are formed by spraying the liquid mixture obtained after step (a) into a tank containing water, thereby cooling the liquid mixture into pellets. Alternatively, the liquid mixture obtained after step (a) is sprayed from the top of a tower against an upward flow or air thereby cooling into pellets.

Optionally, $H_2S$-suppressant-comprising sulphur pellets obtained after step (b) are dried, suitably air-dried or dried in a drying unit. Suitable drying units include drying units wherein heat transfer for drying is accomplished by direct contact between the wet solid and hot gases. Typically, the drying unit is a rotary dryer.

The invention further provides a process to manufacture a sulphur-comprising bitumen-aggregate mixture, also referred to as sulphur-comprising asphalt.

In step (i) of this process bitumen is heated, typically at a temperature of between 120 and 180° C., preferably between 130 and 150° C., more preferably between 140 and 150° C.

In step (ii) of this process aggregate is heated, typically at a temperature of between 120 and 180° C., preferably between 130 and 150° C., more preferably between 140 and 150° C.

In step (iii), the hot bitumen and hot aggregate are mixed in a mixing unit. Typically, the mixing takes place at a temperature of between 120 and 180° C., preferably between 130 and 150° C., more preferably between 140 and 150° C. Typically, the mixing time is between 10 and 60 seconds, preferably between 20 and 40 seconds.

Sulphur pellets comprising $H_2S$-suppressant are added in at least one of the steps (i), (ii) or (iii).

Preferably, the addition of sulphur pellets comprising $H_2S$-suppressant is followed by mixing for an additional time. Typically, the additional mixing time is between 5 and 600, preferably between 10 and 100 seconds.

In a preferred embodiment, hot aggregate is mixed with $H_2S$-suppressant comprising sulphur pellets. Hot bitumen is then added to the hot aggregate-sulphur mixture.

In another preferred embodiment, hot aggregate is mixed with hot bitumen and the $H_2S$-suppressant comprising sulphur pellets are added to the hot bitumen-aggregate mixture. This embodiment offers the advantage of producing a stronger sulphur-asphalt mix strength.

In yet another preferred embodiment, hot bitumen is mixed with $H_2S$-suppressant comprising sulphur pellets and the resulting hot bitumen-sulphur mixture is mixed with hot aggregate to obtain a sulphur-comprising asphalt mixture.

Typically, the amount of sulphur pellets comprising $H_2S$-suppressant added to the bitumen-aggregate (asphalt) mixture is such, that a mixture comprising sulphur and bitumen in a weight ratio from about 1:0.5 to 1:5, preferably from about 1:1 to 1:4, is obtained.

Typically, the bitumen/aggregate mixture comprises at least 2 weight % of bitumen, based on the total weight of the mixture. Mixtures comprising from about 1 weight % to about 10 weight % of bitumen are preferred, with a special preference for mixtures comprising from about 3 weight % to about 6 weight % of bitumen based on the total weight of the mixture.

The sulphur-comprising asphalt paving mixture thus obtained can be used in the paving of roads, for example by applying it to the road with a paving machine, typically followed by roller compaction until the required density has been reached.

The use of sulphur pellets comprising $H_2S$-suppressant eliminates the need for the installation and maintenance of injecting equipment at an bitumen-aggregate mixing plant, thereby offering advantages compared with the process wherein $H_2S$-suppressant are added separately.

Another advantage is that the sulphur pellets comprising $H_2S$-suppressant according to the invention may help to prevent the detachment of bitumen film, the so-called "stripping", from water-sensitive mineral aggregates. This is especially important when hydrated lime is added to asphalt mixtures. The addition of hydrated lime to asphalt mixtures is beneficial because it reacts with bitumen, thereby removing oxygen-comprising bitumen components and forming a strong bond. In sulphur comprising asphalt mixtures however, the addition of hydrated lime causes problems. Some of the lime may be in the CaO state and a reaction with sulphur can take place to form synthetic gypsum. This synthetic gypsum is water-soluble and can cause sulphur-bitumen-aggregate disintegration in the presence of water. The sulphur-pellets comprising $H_2S$-suppressant according to the invention solve this problem as the $H_2S$-suppressant delays bitumen-aggregate disintegrating and can prevent disintegrating from mineral aggregates.

Yet another advantage of the sulphur-pellets according to the invention is that because the $H_2S$-suppressant is incorporated in the sulphur pellet, the $H_2S$-suppressant will be in the vicinity of the sulphur in the final asphalt mixture, thereby being able to suppress the formation of $H_2S$ evolving from the sulphur before the $H_2S$ is released.

Example 1 (Comparative)

A mixture was prepared with the following procedure. Aggregate and bitumen were heated in an oven to 165° C. The bitumen was added to the aggregate and mixed for 30 seconds in a Hobart mixer. Elemental sulphur pastilles without added $H_2S$ suppressant were added and mixed for an additional 150 seconds. The temperature of the mixture was approximately 145° C. after mixing. Approximately 3700 grams of mixture, with the following composition: Aggregate: 3535 g; bitumen: 132 g (3.5%); elemental sulphur: 87 g (2.3%), were then poured into a thermostatically controlled heated vessel. $H_2S$ concentrations in the vessel were measured periodically, approximately 30 mm above the surface of the mixture, with a gas meter with a built-in pump for drawing the $H_2S$ gas into the meter. Measurements were done (a) after initial mixing and at various time periods subsequently, after sulphur-comprising asphalt re-mixing manually with the vessel cover removed and (b) after various time periods with the cover placed on the vessel, to force the gas concentration to accumulate within the vessel.

The mixture was stirred thoroughly from time-to-time and then a cover was placed on the vessel for a short period of time, typically 5 minutes, to allow the $H_2S$ gas to accumulate inside the vessel. The $H_2S$ concentration was then measured at 5 minute intervals. The $H_2S$ concentration was found to be 37 ppm after 5 minutes, at a mix temperature of 145° C.

Example 2 (According to the Invention)

A mixture was prepared using the procedure described in the comparative example, except that $H_2S$-suppressant comprising sulphur pellets, with a $H_2S$-suppressant concentration of 6.5% based on the total pellet, were used.

The resulting mixture had the following composition: Aggregate: 3535 g; bitumen: 132 g (3.5% based on total mix weight); elemental sulphur: 87 g (2.3% based on total mix weight), plus 6 g ferric chloride (hydrated weight 20 g). The $H_2S$ concentration was found to be between 14 and 20 ppm after 5 minutes at a mix temperature of 149° C.

The results clearly show that the use of sulphur pellets comprising $H_2S$ suppressant results in a substantial decrease of $H_2S$ formation.

That which is claimed is:

1. A process to manufacture a sulphur-comprising asphalt paving mixture, the process comprising the steps of:
    (i) preheating bitumen at a temperature of between 120 and 180° C. to provide a hot bitumen;
    (ii) preheating aggregate at a temperature of between 120 and 180° C. to provide a hot aggregate;
    (iii) providing sulphur pellets comprising elemental sulphur, an $H_2S$-suppressant, and, optionally, a filler;
    (iv) mixing the hot bitumen with the hot aggregate and the sulphur pellets in a mixing unit.

2. A process as recited in claim 1, wherein said $H_2S$-suppressant is ferric chloride.

3. A process as recited in claim 1, wherein the $H_2S$-suppressant is distributed substantially homogeneously throughout the sulphur pellet.

4. A process as recited in claim 1, wherein said $H_2S$-suppressant is present in said sulphur pellet in an amount in the range of from 0.02% to 10% (w/w), based on the total weight of said sulphur pellet.

5. A process as recited in claim 4, wherein said $H_2S$-suppressant is selected from the group consisting of iodine, amine compounds, copper salts, copper oxides, iron salts, iron oxides, cobalt salts and cobalt oxides.

6. A process as recited in claim 5, wherein said iron salts include ferric chloride, hydrated ferric chloride, ferrous chloride and hydrated ferrous chloride.

7. A process as recited in claim 6, wherein said filler is present in said sulphur pellet in an amount in the range of from 0.1% to 30% (w/w), based on the total weight of the sulphur pellet, and wherein said filler is a calcium-based mineral filler.

8. A process as recited in claim 1, wherein said sulphur pellet consists essentially of: elemental sulphur, an $H_2S$-suppressant, and, optionally, a filler.

9. A process as recited in claim 8, wherein said $H_2S$-suppressant is ferric chloride.

10. A sulphur pellet composition, consisting essentially of: elemental sulphur, an $H_2S$-suppressant, and, optionally, a filler.

11. A sulphur pellet composition as recited in claim 10, wherein said $H_2S$-suppressant is ferric chloride.

12. A sulphur pellet composition as recited in claim 10, wherein said $H_2S$-suppressant is present in said sulphur pellet in an amount in the range of from 0.02% to 10% (w/w), based on the total weight of said sulphur pellet.

13. A sulphur pellet composition as recited in claim 12, wherein said $H_2S$-suppressant is selected from the group consisting of iodine, amine compounds, copper salts, copper oxides, iron salts, iron oxides, cobalt salts and cobalt oxides.

14. A sulphur pellet composition as recited in claim 13, wherein said iron salts include ferric chloride, hydrated ferric chloride, ferrous chloride and hydrated ferrous chloride.

15. A sulphur pellet composition as recited in claim 14, wherein said filler is present in said sulphur pellet in an amount in the range of from 0.1% to 30% (w/w), based on the total weight of the sulphur pellet, and wherein said filler is a calcium-based mineral filler.

16. A process for making a sulphur pellet, wherein said process comprises:
    mixing elemental sulphur and an $H_2S$-suppressant by the introduction thereof, without the substantial addition of bitumen and aggregate, into a mixing unit for preparing a mixture of said elemental sulphur and said H$_2$S-suppressant; and forming said mixture into said sulphur pellet.

17. A process as recited in claim 16, wherein said elemental sulphur of said mixing step is added to said mixing unit in the form of molten sulphur and the mixing of said mixing step is conducted at a temperature in the range of from 115° C. to 121° C.

18. A process as recited in claim 16, wherein said H$_2$S-suppressant is ferric chloride.

19. A process as recited in claim 16, wherein said elemental sulphur of said mixing step is added to said mixing unit in the form of a slurry comprising sulphur particles dispersed in water.

20. A process as recited in claim 19, wherein said sulphur particles have a size in the range of from about 0.5 microns to about 150 microns.

21. A process as recited in claim 20, wherein said slurry further comprises an emulsifier.

22. A sulphur pellet consisting essentially of an H$_2$S-suppressant in an amount in the range of from 0.02% to 10% (w/w), based on the total weight of the sulphur pellet, and elemental sulphur in an amount of at least about 75 wt %, based on the total weight of the sulphur pellet.

23. The sulphur pellet according to claim 22, consisting essentially of elemental sulphur in an amount of at least about 90 wt %, based on the total weight of the sulphur pellet.

24. The sulphur pellet according to claim 22, wherein the H$_2$S-suppressant is one or more compounds selected from the class of free radical inhibitors and redox catalysts.

25. A sulphur pellet as recited in claim 22, wherein said H$_2$S-suppressant is ferric chloride.

26. The sulphur pellet according to claim 22, wherein the H$_2$S-suppressant is selected from the group consisting of iodine, amine compounds, copper salts, copper oxides, iron salts, iron oxides, cobalt salts and cobalt oxides.

27. The sulphur pellet according to claim 26, wherein the iron salts is an iron chloride compound selected from the group consisting of ferric chloride, hydrated ferric chloride, ferrous chloride and hydrated ferrous chloride.

* * * * *